H. R. HARRIS.
MEASURING INSTRUMENT.
APPLICATION FILED NOV. 19, 1908.
937,302.
Patented Oct. 19, 1909.
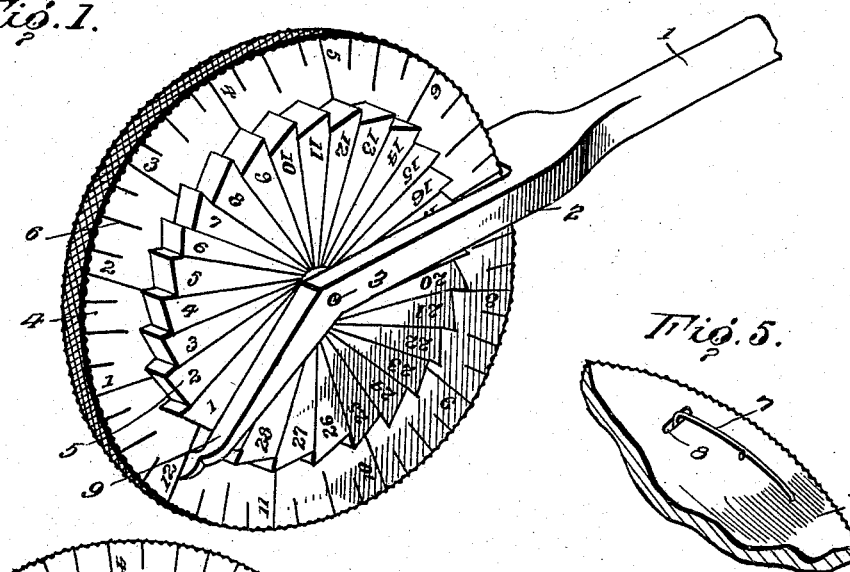
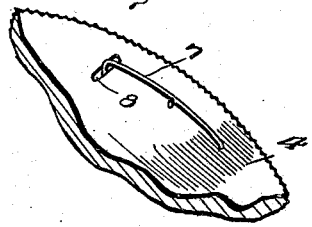
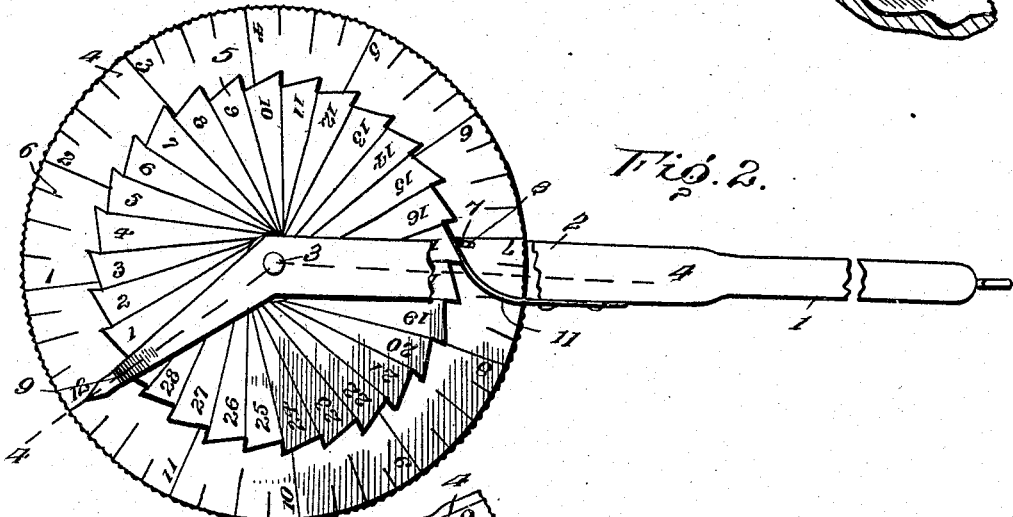
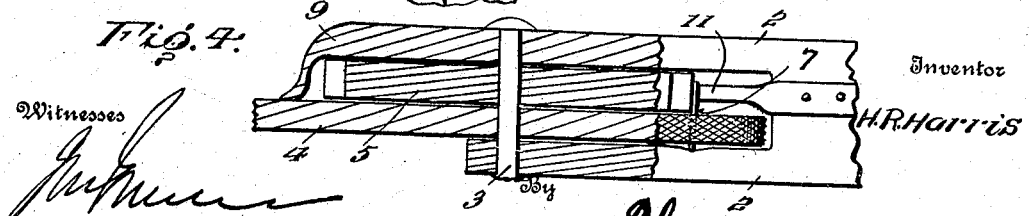
Witnesses
Inventor
H. R. Harris
By
Attorneys

UNITED STATES PATENT OFFICE.

HARRY R. HARRIS, OF EAST LIVERPOOL, OHIO.

MEASURING INSTRUMENT.

937,302. Specification of Letters Patent. Patented Oct. 19, 1909.

Application filed November 19, 1908. Serial No. 463,385.

*To all whom it may concern:*

Be it known that I, HARRY R. HARRIS, citizen of the United States, residing at East Liverpool, in the county of Columbiana and State of Ohio, have invented certain new and useful Improvements in Measuring Instruments, of which the following is a specification.

This invention comprehends certain new and useful improvements in measuring instruments of that type embodying a measuring wheel of known circumference, which is designed to be rolled over the surface to be measured to ascertain the length of the same in terms of the length of the circumference of the measuring wheel, and the object of the invention is to produce a simple, durable and efficient construction of devices of this character which embodies an improved counting mechanism that is designed to be intermittently actuated by and upon each complete revolution of the measuring wheel, to indicate the number of such complete revolutions and any partial revolution, so that the distance over which the device has been rolled may be determined at a glance.

With this and other objects in view that will more fully appear as the description proceeds, the invention consists in certain constructions and arrangements of the parts that I shall hereinafter fully describe, and then point out the novel features thereof in the appended claims.

For a full understanding of the invention and the merits thereof and to acquire a knowledge of the details of construction, reference is to be had to the following description and accompanying drawing, in which:

Figure 1 is a perspective view of a measuring instrument constructed in accordance with my invention; Fig. 2 is a side elevation thereof, parts being broken away; Fig. 3 is a fragmentary view showing the spring tappet pressed into engagement with the counter wheel by the pawl; Fig. 4 is a section on the line 4—4 of Fig. 2; and, Fig. 5 is a detail view showing the manner of securing the tappet to the measuring wheel on the opposite side of the same from the counter wheel.

Corresponding and like parts are referred to in the following description and indicated in all the views of the drawing by the same reference characters.

A measuring instrument equipped with the improvements of my invention, embodies a handle 1 which may be of any desired or approved construction or design, except that it is preferably bifurcated at one end, as indicated at 2. Extending between these bifurcations, is a transverse axle 3 upon which are loosely mounted a measuring wheel 4 and a counter wheel 5, the latter being in the nature of a ratchet. The measuring wheel 4 is of a predetermined circumference, in the present instance 1 foot, and is relatively larger than the counter wheel 5, so as to project outwardly therebeyond, as shown, and is provided upon such projecting portion with a scale 6 graduated in inches and fractions thereof. This projecting portion of the measuring wheel also carries an inwardly yielding spring tappet 7 which, in the present instance, is constructed of a suitable length of spring material that is secured at one end to the measuring wheel on the opposite side thereof from the counter wheel, and which has its other end angularly disposed, as shown, and passing through a slot 8 formed in the measuring wheel, and projecting laterally beyond the opposite side thereof in proximity to the periphery of the counter wheel 5. The slot 8 is formed in the projecting portion of the measuring wheel and extends substantially radially inwardly beyond the line of the teeth of the counter wheel 5, the tappet 7 being normally positioned at the outer end of the slot 8 so as to clear the teeth of the counter wheel, when the measuring wheel is rotated, but such tappet is adapted to be moved inwardly in the slot, under tension, into engagement with the teeth of the counter wheel, for a purpose to be presently disclosed.

The counter wheel 5 is designed to be advanced one tooth by and upon each rotation of the measuring wheel, and the teeth of the wheel 5 are preferably numbered, as shown, and arranged to pass under one of the bifurcations 2 which is extended to constitute a pointer 9 designed to indicate the number of revolutions of the measuring wheel, and hence the number of feet over which the device has been rolled, the extremity of the pointer 9 being offset in proximity to the scale 6, to indicate any partial rotation of the measuring wheel, in inches and fractions thereof. In order to prevent any possible rearward rotation of the counter wheel 5, as would manifestly result in the loss of a count and an error in the measurement, I provide a pawl 11 which is in the form of a flat spring secured at one end to the handle 1 with its other end interposed between the bifurcations 2 and engaging the teeth of the counter wheel 5, as shown, it being observed that said pawl is arranged in the path of rotation of the spring tappet 7.

Preparatory to using my improved measuring instrument, the counter wheel 5 is turned to bring the tooth thereof designated zero into registry with the pointer 9, the zero mark on the scale 6 being placed in alinement with a mark on the surface to be measured, and such zero mark being also brought into registry with the pointer 9, in which position the spring tappet 7 is located in front of and in close proximity to the spring pawl 11. The device is then rolled forwardly to effect a complete rotation of the measuring wheel 4, which movement manifestly brings the spring tappet 7 in the rear of the pawl 11, and since the same is arranged in the path of rotation of the tappet, the latter abuts against the pawl and is moved inwardly thereby, under tension, in the slot 8 and into engagement with the tooth of the counter wheel, just behind the tooth with which the pawl 11 is in engagement. The continued rotary movement of the measuring wheel 4 manifestly turns the counter wheel 5 therewith until the tooth with which the tappet has become engaged is moved forwardly into engagement with the pawl 11, whereupon the counter wheel is advanced one tooth and the tappet is released to spring back to its normal position and continue its movement relative to the counter wheel 5. This operation is repeated by and upon each complete revolution of the measuring wheel 4, so that when the device has reached the other end of the surface to be measured, the pointer 9 indicates precisely the number of complete revolutions of the measuring wheel, or the number of feet over which the device has passed, and also any partial rotation, which latter is shown on the scale 6 in inches and fractions thereof.

From the foregoing description, in connection with the accompanying drawing, it will be apparent that I have provided an improved measuring instrument which is particularly susceptible of use in ascertaining the length of the circumference of a wheel or other curved surface, although it is not restricted to such use; which embodies improved means for counting the number of revolutions of the measuring wheel so that the distance over which the device has been passed may be conveniently ascertained at a glance; which embodies to a marked degree, the elements of simplicity, durability and efficiency of construction and operation, and which consists of comparatively few parts that are not likely to get out of order, and that may be easily and cheaply manufactured and readily assembled.

The measuring wheel 4 has its periphery preferably milled or roughened in any other approved manner, so as to increase the adhesive engagement of the wheel with the surface to be measured, and thus prevent any possibility of the wheel slipping over such surface without turning upon its axis to actuate the counting mechanism.

Having thus described the invention, what I claim is:

1. A measuring instrument embodying a measuring wheel, a toothed counter wheel coöperating therewith, a relatively stationary pawl engaging the teeth of the counter wheel, and means operated by the pawl for intermittently engaging the teeth to turn the counter wheel.

2. A measuring instrument embodying a measuring wheel, a toothed counter wheel, a spring tappet carried by the measuring wheel and normally clearing the teeth of the counter wheel, and a pawl engaging the toothed counter wheel and arranged in operative relation to the tappet.

3. A measuring instrument embodying a measuring wheel, a relatively small toothed counter wheel, the measuring wheel being formed beyond the counter wheel with a slot, a tappet mounted in the slot and normally positioned therein in inoperative relation to the counter wheel, and a pawl engaging the toothed counter wheel and arranged in the path of rotation of the tappet.

4. A measuring instrument embodying a measuring wheel, a toothed counter wheel, a spring pawl engaging the teeth of the counter wheel, and means carried by the measuring wheel and actuated by the pawl for intermittently engaging the counter wheel to effect the actuation of the same.

5. A measuring instrument embodying a measuring wheel, a relatively small toothed counter wheel, an inwardly yielding tappet carried by the measuring wheel and normally arranged in inoperative relation to the teeth of the counter wheel, and a pawl engaging the teeth of the counter wheel and arranged in the path of rotation of the tappet, as and for the purpose specified.

6. A measuring instrument embodying a handle, a measuring wheel and a toothed counter wheel rotatably connected to the handle, a spring pawl carried by the handle and engaging the teeth of the counter wheel, and means carried by the measuring wheel and actuated by the pawl for intermittently engaging the counter wheel to effect the actuation of the same.

7. A measuring instrument embodying a measuring wheel, a toothed counter wheel, a tappet carried by the measuring wheel and spring-pressed into an inoperative position out of engagement with the counter wheel, and means engaging the toothed counter wheel and adapted to intermittently actuate the tappet.

In testimony whereof I affix my signature in presence of two witnesses.

HARRY R. HARRIS. [L. S.]

Witnesses:
W. C. SUPPLEE,
DUANE HARRIS.